Figure 1:
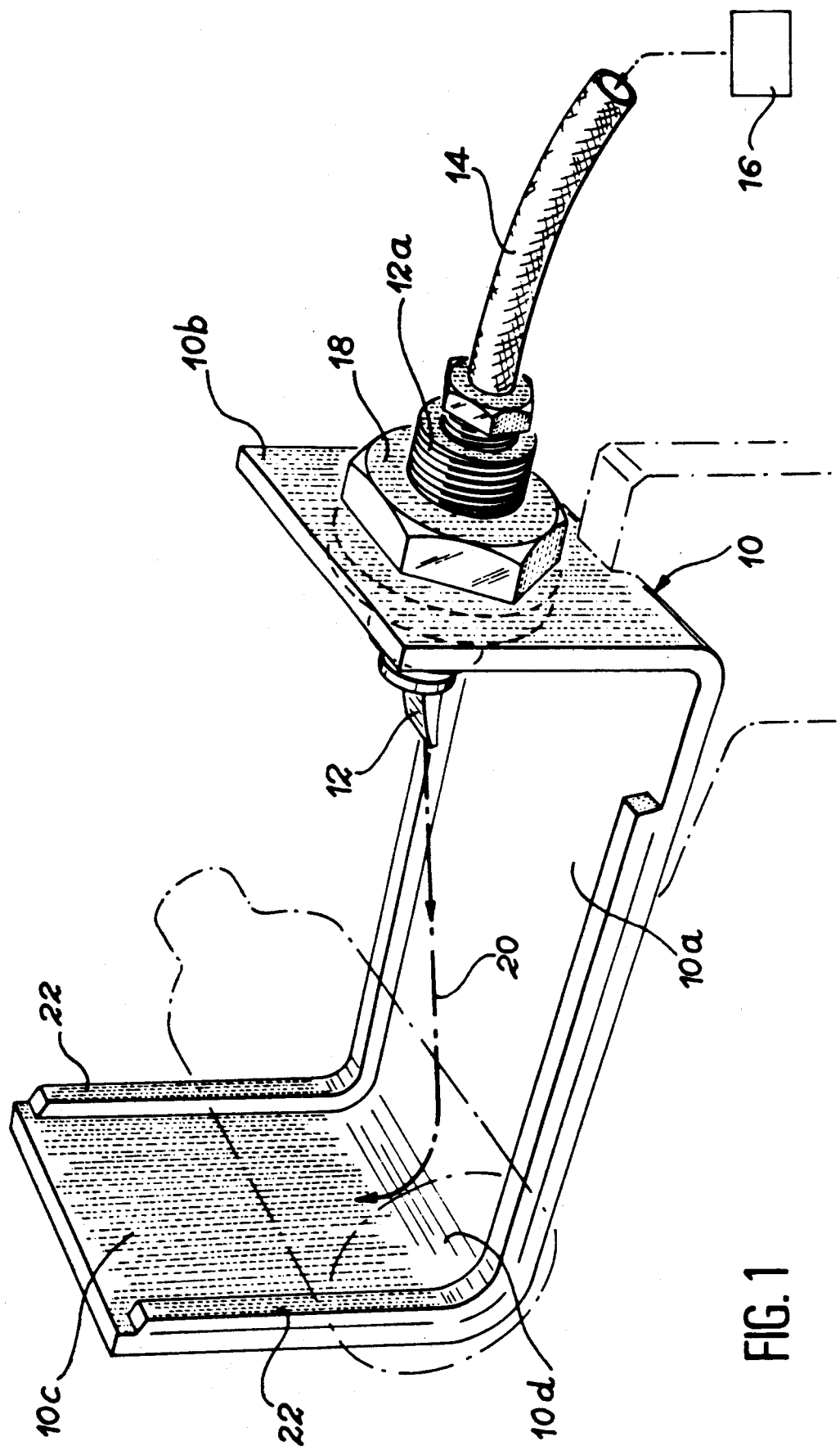

United States Patent [19]

Guyard

[11] Patent Number: 5,066,058
[45] Date of Patent: Nov. 19, 1991

[54] PNEUMATIC GRIPPER

[75] Inventor: Alain Guyard, Saint Paul-Trois Châteaux, France

[73] Assignee: Cogema Compagnie Generale des Matieres Nuclearies, Cedex, France

[21] Appl. No.: 460,140

[22] PCT Filed: Oct. 2, 1989

[86] PCT No.: PCT/FR89/00508

§ 371 Date: May 29, 1990

§ 102(e) Date: May 29, 1990

[87] PCT Pub. No.: WO90/03871

PCT Pub. Date: Apr. 19, 1990

[30] Foreign Application Priority Data

Oct. 3, 1988 [FR] France .................................. 88 12896

[51] Int. Cl.$^5$ .............................................. B66C 1/02
[52] U.S. Cl. ............................. 294/1.1; 294/64.3; 901/30; 901/40
[58] Field of Search ................ 294/1.1, 64.2, 64.3; 901/30, 40; 198/468.4, 471.1, 803.5

[56] References Cited

U.S. PATENT DOCUMENTS

| 3,539,216 | 11/1970 | Forcier | 294/64.3 |
| 4,002,254 | 1/1977 | Olofsen | 294/64.3 X |
| 4,502,721 | 3/1985 | Savin-Czeizler et al. | 294/1.1 |

FOREIGN PATENT DOCUMENTS 257628 11/1969 U.S.S.R. ............................. 294/64.3

*Primary Examiner*—Margaret A. Focarino
*Assistant Examiner*—Dean Kramer
*Attorney, Agent, or Firm*—Pearne, Gordon, McCoy & Granger

[57] ABSTRACT

For grasping objects having a limited weight and a random shape, a pneumatic gripper is proposed, which has an approximately U-shaped support (10) and a compressed air ejection nozzle (12), mounted on one of the end branches (10b) of the support and oriented towards the intermediate branch (10a), in the vicinity of the bend (10d) connecting the latter to the other end branch (10c). Rails (22) channel the compressed air jet from the nozzle (12) to the end of the branch (10c). The object (O) is attracted by the pressure drop or vacuum formed in the vicinity of the bend (10d) and can then be raised and manipulated.

3 Claims, 2 Drawing Sheets

U.S. Patent    Nov. 19, 1991    Sheet 1 of 2    5,066,058

PNEUMATIC GRIPPER

The invention relates to a pneumatic gripper more particularly designed for use on an automaton or robot.

The grippers normally used on robots are mechanisms in the form of grabs having at least two articulated fingers. The gripping of an object takes place by bringing each of the fingers into contact with said object and by applying thereto an adequate force to permit its handling.

Such grippers constitute a satisfactory solution when it is wished to transport a non-fragile object. Thus, they then have the advantage of allowing objects with an often considerable weight to be gripped. Moreover, they make it possible to apply a force to said object when this is necessary, e.g. for putting it into place.

However, these known grippers suffer from numerous disadvantages. Firstly, when the grasped object is fragile, its gripping by a grab-like gripper may lead to its deformation. Moreover, before gripping an object, it is necessary to accurately position the gripper with respect thereto. Furthermore, articulated grippers are complex equipment having wearing parts, whilst also being relatively heavy and onerous.

The invention specifically relates to a gripper for transporting fragile objects without any crushing risk, said gripper not having to be accurately positioned with respect to the objects to be seized and having a particularly simple and inexpensive design, because it has no moving parts.

According to the invention, this result is obtained by means of a pneumatic gripper, characterized in that it comprises an approximately U-shaped support, whereof one end branch carries an ejection nozzle connected to a compressed air source, the nozzle being oriented towards the intermediate branch of the support, in the vicinity of a bend connecting said intermediate branch to the other end branch of the support, the latter being shaped in such a way as to channel the compressed air ejected by the nozzle towards the end of the other end branch.

In such a pneumatic gripper, the grasping of an object is brought about by means of the pressure differences created by the compressed air jet leaving the nozzle. Thus, such a gripper makes it possible to transport objects having a limited weight without damaging them when they are fragile. Moreover, the gripper does not have to be accurately positioned with respect to the object to be grasped, because the latter is automatically attracted when the compressed air intake is open. Finally, it has no moving parts, so that it cannot become worn out and is also light, inexpensive and self-cleaning, because the compressed air jet ensuring the necessary gripping automatically cleans the active surface of the support.

Preferably, the support has a plate which is laterally defined, on its face turned towards the interior of the U and on either side of the bend, by two rails for guiding the compressed air ejected by the nozzle.

An embodiment of the invention is described in greater detail hereinafter relative to the drawings, wherein show:

FIG. 1 A perspective view of a pneumatic gripper according to the invention.

Figure 2A:
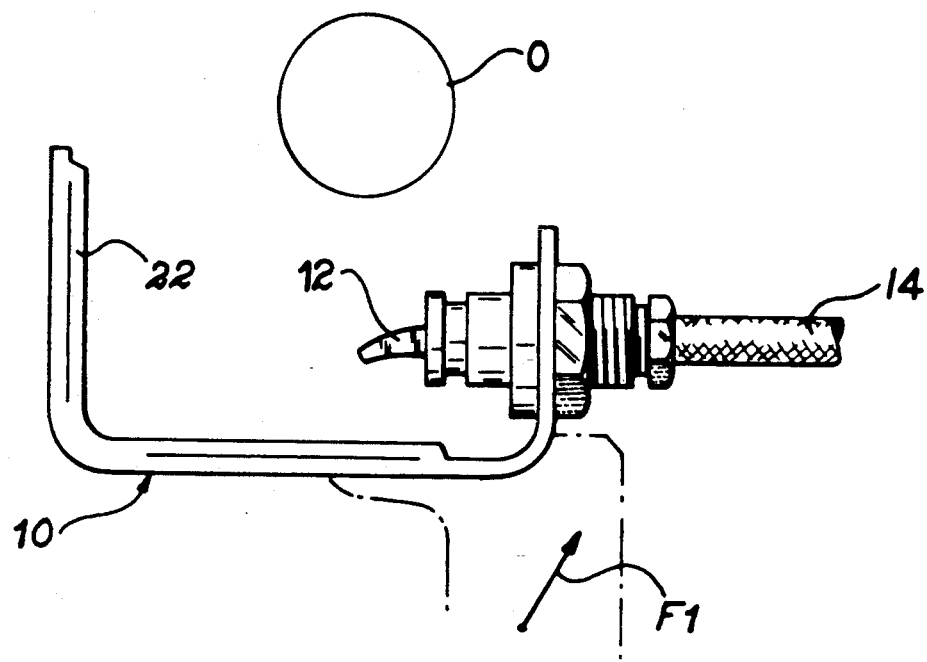
Figure 2B:
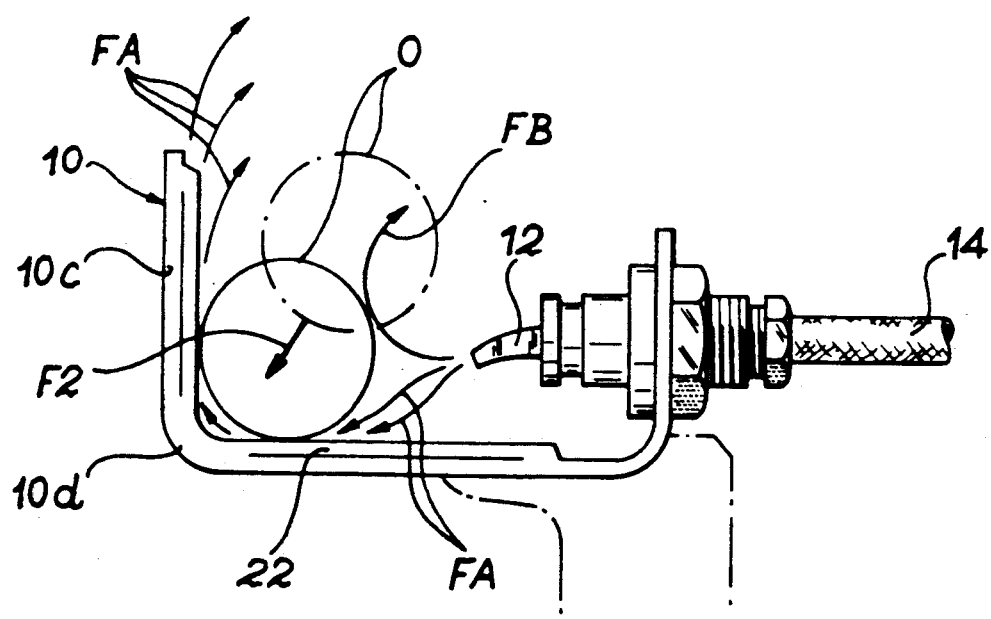

FIGS. 2a & 2b Side views of the gripper of FIG. 1 respectively illustrating the approach of the object to be grasped by the gripper and the actuation of the latter permitting the holding of said object.

As illustrated in FIG. 1, the pneumatic gripper according to the invention has an approximately U-shaped, rigid support 10, which can e.g. be mounted on the end of the articulated arm of an automaton or robot. The support 10 is constituted by a rectangular plate, e.g. made from metal or a plastics material and whose ends are bent at approximately 90° with respect to the central part 10a of the plate, in order to form two end branches 10b and 10c.

The end branch 10b of the support 10 carries an ejection nozzle 12 connected by a flexible pipe 14 to a compressed air source 16. The ejection nozzle 12 has a threaded portion 12a, which traverses a hole formed in the centre of the branch 10b of the support and it is fixed to said branch by a nut 18 screwed onto the threaded portion 12a. However, the nozzle 12 can be fixed to branch 10b of the support by any other means without passing outside the scope of the invention.

The ejection nozzle 12 issues into the interior of the U formed by the support 10 and is located in the median plane of the latter and oriented towards a bend 10d formed in support 10 at the intersection of branches 10a and 10c. More specifically, the compressed air jet 20 leaving nozzle 12 strikes the intermediate branch 10a in the vicinity of bend 10d.

In order to channel the compressed air jet 20 leaving the ejection nozzle 12, the support 10 also has two side rails 22 located along the sides of the support 10 on the face of the latter turned towards the interior of the U. Rails 22 extend on either side of the bend 10d over the entire length of the end branch 10c and over most of the length of the intermediate branch 10a of the support. They ensure that a compressed air jet leaving the ejection nozzle 12 does not pass beyond the sides of the support.

The rails 22 can be in one piece with the support 10, particularly when the latter is made from a moulded plastics material. They can also be connected to the plate consituting the support 10, e.g. by bonding or welding.

The use of the pneumatic gripper described hereinbefore with reference to FIG. 1 will now be described in detail relative to FIGS. 2a and 2b. In order to grasp an object, whose profile is indicated at O in FIG. 2a, the pneumatic gripper is moved towards said object without any particular accuracy being required, in such a way that the object is located in the vicinity of the face of support 10 turned towards the interior of the U. This approach operation is illustrated by arrow F1 in FIG. 2a. During the gripper approach of the object, the compressed air supply from nozzle 12 is interrupted.

As illustrated in mixed line in FIG. 2b, when the object O is in part encircled by the C-shaped support 10, the compressed air supply is opened, so that a compressed air jet is ejected by nozzle 12. Bearing in mind the orientation of the latter, the compressed air channelled by rails 22 follows an inwardly curved path at bend 10d along branch 10c. Thus, a pressure reduction or vacuum zone is created in the region around which the jet passes, in the vicinity of bend 10. The ejection of compressed air by nozzle 12 consequently has the effect of engaging the object O with the rails 22 of the support in the vicinity of bend 10d and as illustrated by arrow F2 in FIG. 2b.

The position of object O when engaging against rails 22 under the effect of the compressed air jet from nozzle 12 is shown in continuous line form in FIG. 2b. In this position, part of the compressed air jet continues to pass round the object O between the rails 22 (arrows FA), whilst another part of said jet strikes the object and then passes directly out of the support (arrows FB), which has the effect of helping to maintain the object in the gripper. Under these conditions, the object can be displaced in any direction with the aid of the gripper.

By giving the dimensions of the support 10 and the pressure of the compressed air jet values appropriate for the dimensions and weight of the objects to be seized, it is possible to use the pneumatic gripper according to the invention for seizing objects having varied dimensions and weights. In a non-limitative example, the depth of the U-shaped support 10 can be approximately 3 cm and the compressed air supply pressure approximately 6 bars.

Thus, tests have shown that a gripper according to the invention having the aforementioned characteristics makes it possible to raise and manipulate full bottles with a weight exceeding 100 g, paper handkerchiefs, stoppers, recording pens, nuts, etc.

Thus, the pneumatic gripper described hereinbefore makes it possible to seize or grasp objects having a random shape and a limited weight. Moreover, there is no need for an accurate positioning of the gripper with respect to said objects. Moreover, in view of the fact that the gripper according to the invention has no moving parts, it does not become worn out and can be easily controlled. The gripper is also light and inexpensive, whilst the compressed air jet bringing about the gripping action also ensures the self-cleaning of the support.

Obviously, the invention is not limited to the embodiment described in exemplified manner hereinbefore and in fact covers all variants thereof. In particular, the shape of the gripper support can differ slightly from that described hereinbefore. Thus, the inwardly curved part can have a larger radius. Instead of being produced in a planar plate, the support can have an approximately C-shaped section, whose opening is turned towards the interior of the U and whose edges fulfil the function of channelling the compressed air, as effected by rails 22 in the described embodiment.

Moreover, the gripper can be placed on a randomly shaped robot and can also be equipped with a handle permitting its direct handling by an operator, e.g. in the case of particularly fragile objects or those whose direct handling by human operators can be dangerous (razor blades, etc.).

I claim:

1. A pneumatic gripper, comprising a substantially U-shaped support including a plate having an intermediate branch and two end branches, an ejection nozzle carried by a first of said end branches and connected to a compressed air source, said ejection nozzle supplying a compressed air jet which strikes the intermediate branch in the vicinity of a bend formed in said plate, at the intersection of the intermediate branch with a second of said end branches, jet guide means being provided on said plate to channel the compressed air jet from said intermediate branch to an end of said second end branch opposite to said bend.

2. A pneumatic gripper according to claim 1, wherein said jet guide means comprise two rails provided on a face of said plate on which issues said ejection nozzle, along lateral sides of said plate.

3. A pneumatic gripper according to claim 1, wherein the end branches of the plate are bent at substantially 90° with respect to the intermediate branch.

* * * * *